United States Patent
D'Angelo et al.

(10) Patent No.: US 9,429,965 B2
(45) Date of Patent: Aug. 30, 2016

(54) MULTIPLE CHIP VOLTAGE FEEDBACK TECHNIQUE FOR DRIVING LED'S

(75) Inventors: Kevin Peter D'Angelo, Carmel, CA (US); Eddie Lok Chuen Ng, San Francisco, CA (US)

(73) Assignee: ADVANCED ANALOGIC TECHNOLOGIES INCORPORATED, San Jose, CA (US)

( * ) Notice: Subject to any disclaimer, the term of this patent is extended or adjusted under 35 U.S.C. 154(b) by 482 days.

(21) Appl. No.: 12/611,853

(22) Filed: Nov. 3, 2009

(65) Prior Publication Data

US 2013/0293208 A1 Nov. 7, 2013

(51) Int. Cl.
 G05F 1/565 (2006.01)
 G05F 1/46 (2006.01)
 H05B 33/08 (2006.01)

(52) U.S. Cl.
 CPC .............. *G05F 1/461* (2013.01); *G05F 1/565* (2013.01); *H05B 33/0815* (2013.01); *H05B 33/0827* (2013.01)

(58) Field of Classification Search
 CPC .......... G05F 1/46; G05F 1/461; G05F 1/462; G05F 1/56; G05F 1/565; G05F 1/567; G05F 1/569; G05F 1/571; G05F 1/573
 USPC ....... 323/234, 237, 265, 266, 267, 268, 271, 323/299, 300; 315/185 R, 186
 See application file for complete search history.

(56) References Cited

U.S. PATENT DOCUMENTS

| | | | |
|---|---|---|---|
| 5,923,152 A | 7/1999 | Guerrera | |
| 6,271,651 B1 | 8/2001 | Stratakos et al. | |
| 6,864,641 B2 * | 3/2005 | Dygert | 315/216 |
| 7,116,086 B2 | 10/2006 | Burgyan et al. | |
| 7,235,954 B2 | 6/2007 | Murakami | |
| 7,777,704 B2 | 8/2010 | S et al. | |
| 7,990,119 B2 * | 8/2011 | Petty | 323/273 |
| 8,179,051 B2 | 5/2012 | Zhao | |
| 8,531,164 B2 | 9/2013 | D'Angelo | |
| 2003/0090246 A1 | 5/2003 | Shenai et al. | |
| 2004/0135522 A1 | 7/2004 | Berman et al. | |
| 2006/0028150 A1 | 2/2006 | Vitunic et al. | |
| 2006/0108933 A1 | 5/2006 | Chen | |
| 2008/0258636 A1 | 10/2008 | Shih et al. | |
| 2009/0102444 A1 | 4/2009 | Nonaka | |

(Continued)

FOREIGN PATENT DOCUMENTS

WO 2007096868 A1 8/2007

OTHER PUBLICATIONS

Texas Instruments, Synchronous Buck Converter Design Using TPS56xx Controllers in SLVP10x EVMs User Guide, Sep. 1998.

*Primary Examiner* — Jeffrey Gblende (74) *Attorney, Agent, or Firm* — Lando & Anastasi, LLP (57) ABSTRACT

A multiple chip voltage feedback technique allows multiple strings of LED's and current sinks to be efficiently powered by a DC-to-DC voltage converter within an appliance. A connected series of differential amplifiers or multiplexers are used to monitor the voltages between the connected LED's and the current sinks, progressively determine the lowest voltage, and then feed the lowest voltage back to the voltage converter. The DC-to-DC voltage converter monitors this lowest voltage and adjusts its output in order to ensure that the strings have adequate voltage with which to function, even as the LED's have different forward voltages and the strings are asynchronously enabled and disabled.

25 Claims, 4 Drawing Sheets

(56) References Cited

U.S. PATENT DOCUMENTS

| | | |
|---|---|---|
| 2009/0108776 A1 | 4/2009 | Zhao |
| 2009/0128045 A1* | 5/2009 | Szczeszynski et al. .. 315/185 R |
| 2009/0187925 A1* | 7/2009 | Hu et al. ....................... 719/327 |
| 2009/0206808 A1 | 8/2009 | Wrathall |
| 2009/0230881 A1 | 9/2009 | Chen et al. |
| 2010/0019751 A1 | 1/2010 | Chen et al. |
| 2010/0045210 A1 | 2/2010 | Hariharan |
| 2010/0066257 A1* | 3/2010 | Lin et al. ...................... 315/161 |
| 2010/0156315 A1* | 6/2010 | Zhao et al. .................... 315/294 |
| 2010/0201278 A1* | 8/2010 | Zhao ......................... 315/185 R |
| 2013/0300293 A1 | 11/2013 | D'Angelo |
| 2013/0313996 A1 | 11/2013 | Williams |

* cited by examiner

MULTIPLE CHIP VOLTAGE FEEDBACK TECHNIQUE FOR DRIVING LED'S

RELATED APPLICATIONS

This application is related to the subject matter of a concurrently filed application entitled "Voltage Converting LED Circuit with Switched Capacitor Network." The disclosure of the concurrently filed application is incorporated in this application by reference.

BACKGROUND OF THE INVENTION

Current LCD screens with white LED backlight technology use a variety of configurations of the LED backlights. In these devices, the color of the picture is generated by opening and closing the LCD's; the brightness of the picture is provided from the LED backlight. The picture in front of the backlight can be switched off by disabling all of the backlight LED's; one section of the picture can be switched off by disabling the corresponding section of the backlight LED's; or all or part of the picture can be effectively dimmed by pulsing the corresponding backlight LED's on and off in a PWM fashion.

Figure 1:
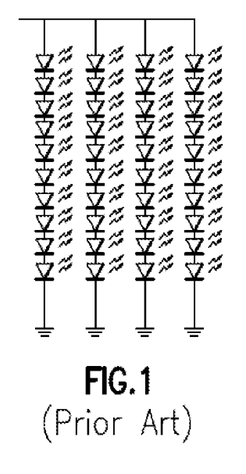
FIG. 1 shows four parallel strings of 10 LED's each.

In many of these screens, the LED's are configured in multiple parallel strings, with each string containing more than one LED. In FIG. 1, for example, the illustrated configuration consists of 4 strings of ten LED's per string.

Figure 2:
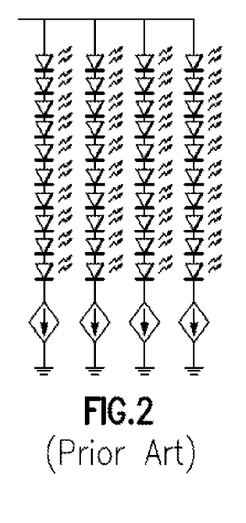
FIG. 2 shows four parallel channels of 10 LED's and one current sink per channel.

Each string also generally contains a current sink that controls the amount of current passing through each string. When the current through each string is equal to the current through every other string, each LED in the configuration produces the same light. That "same light" produced by one LED is consistent in terms of both brightness and color spectrum to the light produced by every other LED. FIG. 2 illustrates the same 4×10 configuration of LED's with the 4 associated current sinks. Together, we refer to one string of LED's and the associated current sink as one "channel." FIG. 2 consists of four channels.

In most cases, the power supply of the appliance that contains the multiple channels does not produce the precise voltage that the channels require in order to operate, and the voltage must be stepped up or down by a DC-to-DC voltage converter. In order to maximize the efficiency of the voltage conversion, the converted voltage should be the smallest possible voltage that enables all of the LED strings to operate normally. For example, in the example of FIG. 2, if the 10 LED's have forward voltages that are centered around 3.5 volts, and the current sink has a voltage requirement of 1.0 volts, the supplied voltage that will enable each string to operate will be in the general neighborhood of 36 volts, derived as 10 times 3.5 volts plus 1.0 volts.

Unfortunately, the forward voltage requirements of the LED's are not uniform. Though the forward voltages may be centered about 3.5 volts (or some other voltage), the manufacturing process can lead to differences from one LED to the next. Hence, each channel can have different minimum operating voltage requirements, and even though many appliance manufacturers can adopt strategies to construct strings of LED's that are roughly similar in their forward voltage requirements, variations are inevitable.

Another issue occurs as the different channels are cycling on and off independently of one another. For example, if the channels are cycled on and off in a PWM fashion in order to dim all or part of the backlight, but different channels are cycled at different rates, the lowest forward voltage of the operating channels may vary from one instant to the next, and the converter may need to adjust its timing from one instant to the next. In addition, the changing current requirements of the channels cycling on and off can affect the performance of the aforementioned DC-to-DC converter, which can in turn affect the performance of the appliance's power supply. Both of these effects can affect the produced voltage, and should be fed back to the DC-to-DC converter in order to ensure efficient and accurate voltage supply.

Figure 3:
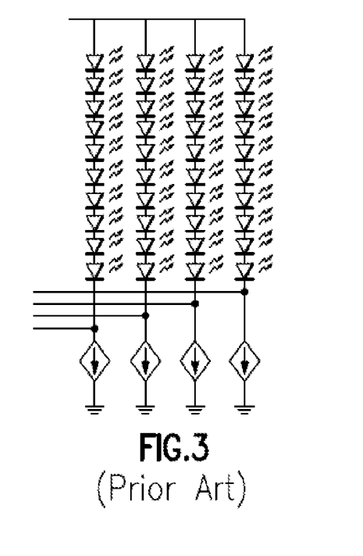
FIG. 3 shows four parallel channels of 10 LED's and one current sink per channel, with connections to enable the measurement of the voltages across the current sinks.

In order to adjust the supplied voltage, the voltages of each operating (non-disabled) channel are monitored at the point between the LED's and the current sinks, as is illustrated in FIG. 3. As long as the voltage that is present at the measuring point is greater than the known voltage required by the current sinks, the channels will operate normally. It follows, then, that in order for all of the channels to operate normally, the voltage supplied to the strings by the converter must provide enough voltage at the point of measurement for each current sink to operate.

SUMMARY OF THE INVENTION

Figure 4:
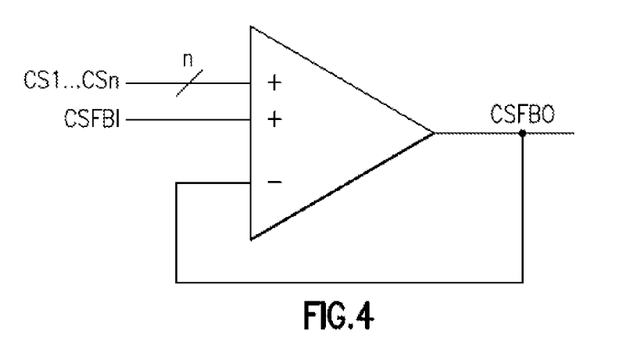
FIG. 4 shows a modified operational amplifier with n+1 positive inputs and 1 negative input.
Figure 5:
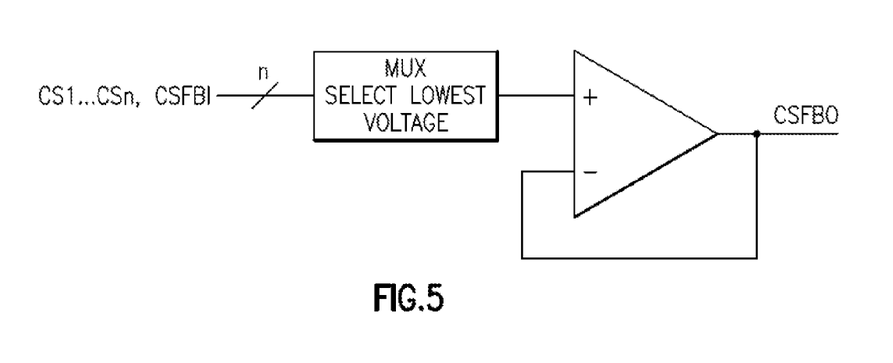
FIG. 5 shows a multiplexor with n+1 inputs in series with an operational amplifier.

The current invention is a circuit that facilitates a voltage converter's "production" of the lowest voltage required to run all of the channels independently and concurrently. It uses one or more devices to "find" the lowest measured current sink feedback voltage (as is shown in FIG. 3), and then feeds that lowest voltage back to the DC-to-DC converter. (This feedback input to the DC-to-DC converter is shown generally in the drawings as $V_{FB}$.) The devices that do the comparisons can comprise one or more separate buffers, where each buffer is an operational amplifier that takes a number of different voltage inputs and outputs the smallest voltage. The devices might also comprise one or more multiplexers, or multiplexor-buffer pairs. Depictions of these two circuits are show in FIGS. 4 and 5.

Figure 6:
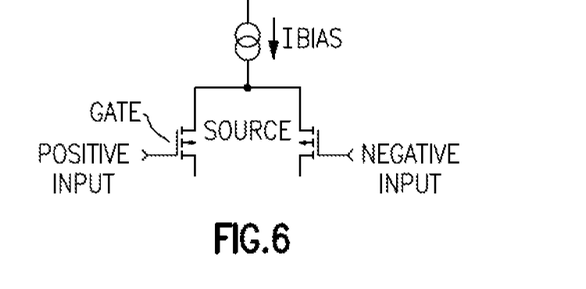
FIG. 6 shows a first gain stage differential amplifier (the input pair) with one transistor on each of the positive and negative terminals.
Figure 7:
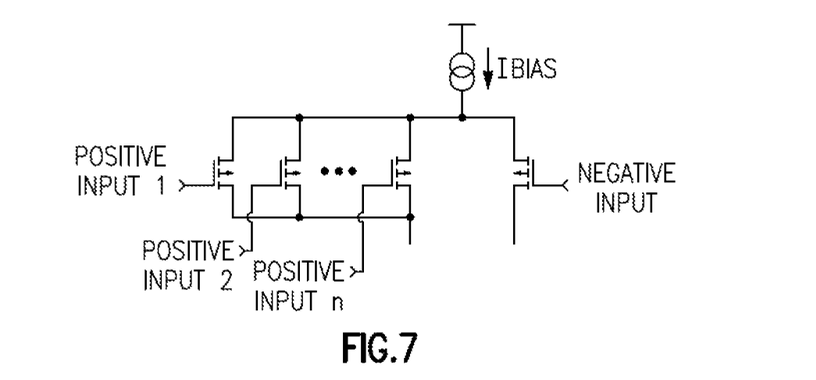
FIG. 7 shows a first gain stage differential amplifier (the input pair) with multiple transistors on each of the positive terminal and one transistor on the negative terminals.
Figure 8:
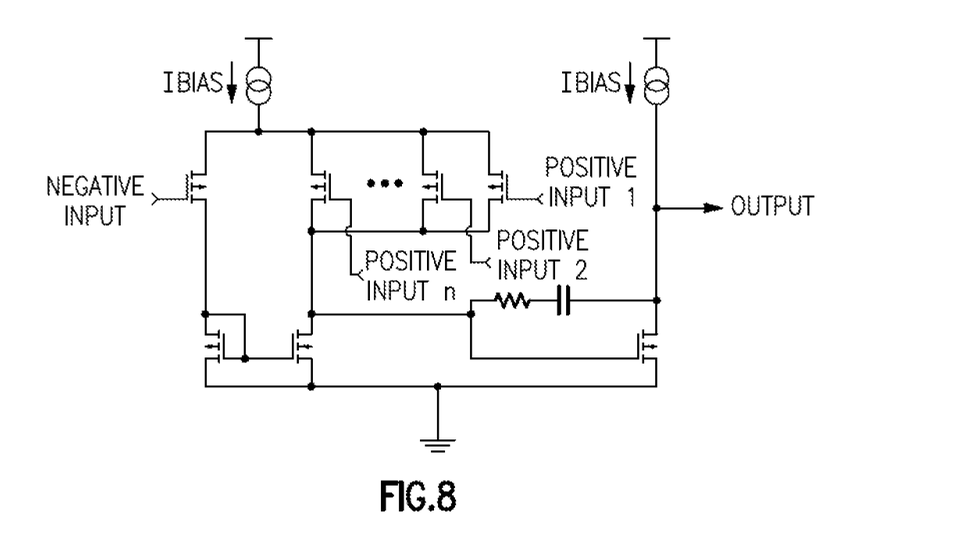
FIG. 8 shows a basic two stage amplifier with multiple positive inputs.

The physical transistor layout for the input to such a buffer is outlined in FIG. 6 and FIG. 7, and a simple schematic for the whole of such a buffer is shown in FIG. 8.

Figure 9:
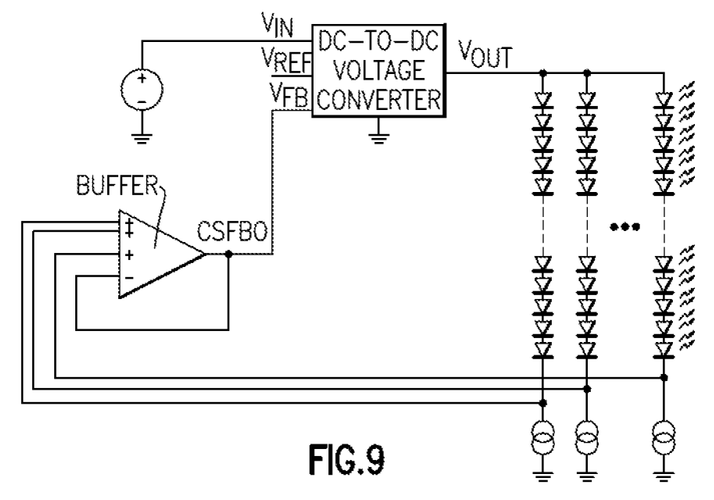
FIG. 9 shows a circuit that uses one multiple input differential amplifier to determine the smallest voltage across any of the current sinks.

The DC-to-DC converter also uses either an externally supplied or internally generated reference voltage (shown generally in the drawings as $V_{REF}$) as the "desired minimum voltage" that should be available for the current sinks. The DC-to-DC converter's function is to keep $V_{FB}$ above $V_{REF}$, but only by a small amount. In some cases, as is shown in FIG. 9, the appliance that contains the DC-to-DC converter can supply an appliance generated, external $V_{REF}$ to the converter. This may be a preferable architecture when the current sinks differ from one model of the appliance to another, but the appliance manufacturer prefers to use the same model of the DC-to-DC converter across all of the different models. In other cases, $V_{REF}$ could be "hardwired" into the DC-to-DC converter if the operating voltage of the current sinks was known in advance. Such a decision would depend on the application.

Consider FIG. 9, for example. If the three visible current sinks require 1.0 volts in order to function, it would be inefficient to have the voltages between the various substrings of LED's and their current sinks to range in the neighborhood of 2.0 volts. If in one particular instance, the measured voltages happened to be 1.8 volts, 1.9 volts, and 2.0 volts, the invention would compare all of the voltages present on the strings and return the 1.8 volt value to the DC-to-DC power supply via the CSFBO signal line. The power supply would, in turn, adjust its output ($V_{OUT}$) downward, eventually settling in a state wherein the 1.8 volt "minimum voltage" was much closer to the 1.0 volt "required voltage."

If the reverse were true and the minimum returned voltage was less than 1.0 volts, the buffer might return 0.8 volts, signaling to the DC-to-DC power supply that the LED strings needed more voltage. CSFBO would indicate a deficient voltage, and the power supply would attempt to adjust $V_{OUT}$ upwards.

Figure 10:
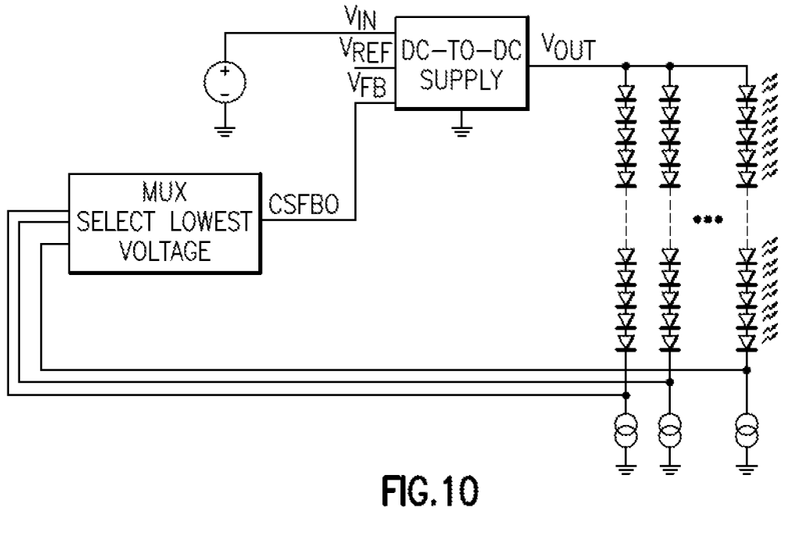
FIG. 10 shows a circuit that uses one multiplexor to determine the smallest voltage across any of the current sinks.

FIG. 10 shows a schematic of the invention where the device exists as a separate multiplexor. Circuits that combine buffer and multiplexers to achieve the same result are also possible.

It is also desirable to extend the number of channels that can be powered from one voltage converter past the ability of one buffer or one multiplexor to manage. For example, if the capability of one buffer is 8 channels, but a large appliance has 32 channels, the ability to link 4 buffers together, with the ability to power all of the channels from one power source, would be valuable.

Figure 11:
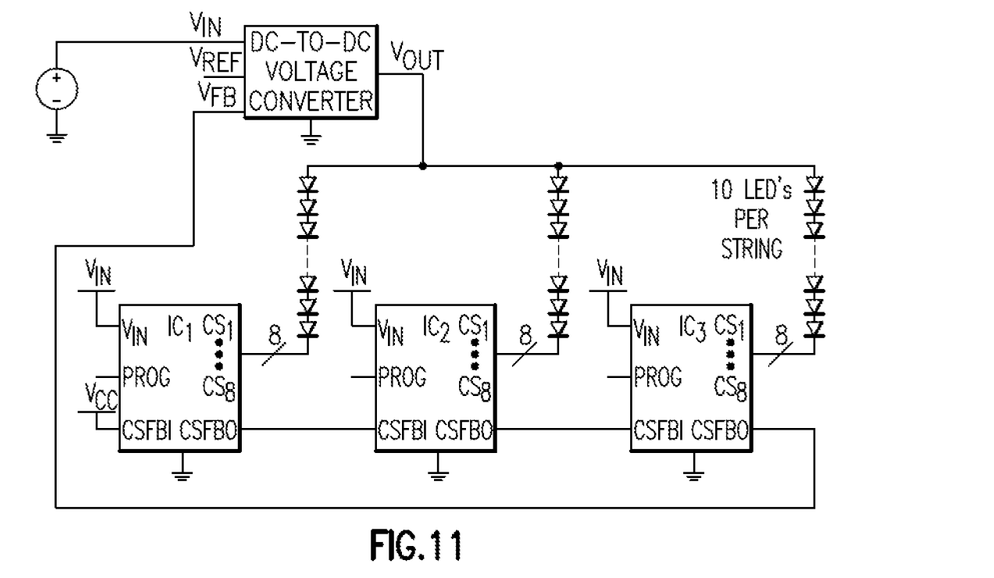
FIG. 11 shows an embodiment of the invention with much of the control functionality distributed within three integrated circuits.

FIG. 11 shows such a configuration, with 3 integrated circuits that are connected together. In this example, the multiple current sinks and the single buffer from FIG. 9 (or the multiplexor, from FIG. 10) are combined into each IC, though the functions could be split apart.

Consider the first IC in FIG. 11. Each of the LED strings is connected to a distinct connection on the IC, and then directly to a distinct current sink within the IC. The IC itself manages the determination of the lowest voltage between the LED strings and the current sinks of all of the channels in operation at a particular instant, and outputs this voltage on its CSFBO connection.

Each of the next sequential IC's performs the same task, except that a comparison is also made with the CSFBO of the previous IC in the sequence with the result then being output on this channels CSFBO. For example, $IC_2$ compares its CSFBI voltage (from $IC_1$'s CSFBO) with its own N $CS_i$ voltages to find the lowest voltage, and outputs this voltage on its own CSFBO, which is then used by $IC_3$. In this manner, the lowest voltage travels from IC to IC, and is eventually fed back to the DC-to-DC voltage converter.

There are certain issues that are managed by the circuits in FIG. 11. In the case of the first IC, the CSFBI "input" from the previous IC—which does not exist—is tied to an arbitrarily high voltage so that the lowest voltage from one of this IC's connected strings is found to be lowest and passed to $IC_2$.

Another issue occurs when the appliance has switched various strings of LED's off—perhaps by disabling the corresponding current sinks. In this scenario, the voltages from the disable channels must be disregarded. There are a number of different ways that this can be accomplished. It may be true that the measured voltage in a non-operational string may rest at some arbitrarily high point which will self-exclude it from the determination of the lowest voltage. If so, nothing further must be done. In a more active method, the IC or another part of the invention may automatically detect the non-operation, and exclude its voltage from the determination. If this is not possible, the appliance or the integrated circuit may be required to pull the non-operational channel's measured voltage to an arbitrarily high level in order for it to be effectively disregarded by the invention. Regardless of which of these options is used to disregard non-operational channels, the functionality of "pulling high" must be engineered.

Figure 12:
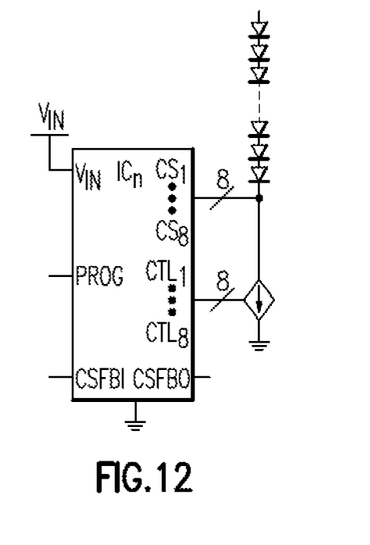
FIG. 12 shows a different configuration of the current sinks and integrated circuits, wherein the current sinks are both external to the integrated circuits and connected to ground.

FIG. 12 illustrates how the integrated circuits of FIG. 11 could be modified to remove the current sinks from the IC's to make them external. If the current sinks are a source of unwanted heat, managing that heat elsewhere in the appliance could be an advantage. Whereas the IC's in FIG. 11 had inputs for the channels between the outboard LED's and the onboard current sinks, the points of interface in FIG. 12 connect between the outboard LED's and the outboard current sinks. In FIG. 12, the integrated circuit measures the voltage between the LED's and the current sinks, but would not play any part in measuring or controlling the flow of current through the LED's.

Figure 13:
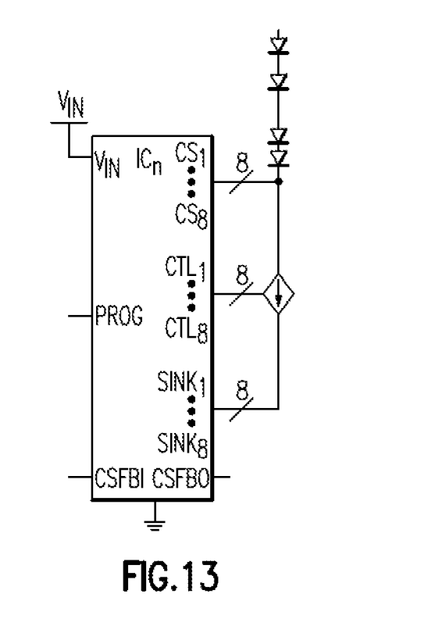
FIG. 13 shows a different configuration of the current sinks and the integrated circuits, wherein some portions of the current sinks are external to the integrated circuits while other portions are internal.

Other variations of the relationship between the current sink and the integrated circuit would be possible. In FIG. 13, the integrated circuit would measure the voltage and play a part in measuring or controlling the current. It could be a situation where parts of the current sink—those that do not produce a large amount of excess heat—are left off of the IC, while other parts of the current sink are brought onboard.

Other variations in the types of measurements taken are also possible. It might be desirable, in other circumstances, to vary the output of the DC-to-DC converter based on the amount of current flowing through each LED channel rather than the voltage at a particular point. For example, an inexpensive cellular phone with only two or three LED channels might have resistors rather than current sinks connected into each channel, and might be interested only in the amount of light produced rather than the exact spectrum of that light. If this current monitoring was desirable, the integrated circuits could be connected to current senses, and could then pass the highest—or the lowest—current back to the DC-to-DC converter using the same system of daisy chained integrated circuits. The DC-to-DC converter would then alter its operation in order to provide a rough amount of light appropriate for the particular device.

It might also be desirable for the integrated circuits to have some "exterior" knowledge of each connection and the associated LED channel. For example, the integrated circuit might be designed to ignore channels that are indicated as INACTIVE. In such an enclosing device, a separate master controller could control the individual current sinks but indicate a status to the controllers defined here. Then, when a particular current sink is switched off, the appropriate controller would ignore the irrelevant voltage reading from the associated channel. Using a mechanism such as this one would alleviate the need to rely on either the voltage drifting upwards when the current sink was disabled, or the ability of the enclosing device to artificially tie the voltage of the disabled channel to a high level. (In the absence of the status indicator, a high voltage would cause the reading from the channel to be effectively ignored in the search for the lowest voltage.)

DETAILED DESCRIPTION OF THE PREFERRED EMBODIMENTS

FIG. 11 shows a schematic of an embodiment of the invention that contains three integrated circuits, each integrated circuit controlling eight strings of ten LED's per string. In this embodiment, much of the functionality of measuring the voltages, comparing the voltages, and controlling the current through the LED's is contained with the three integrated circuits, and this embodiment is typically contained within a television that uses the strings of LED's as a backlight device.

In this embodiment, the integrated circuits also control, via commands from the television, each of the 24 strings of LED's, turning them on or off, or dimming them via a PWM mechanism internal to the individual integrated circuits, as requested by the television. The integrated circuits operate on the current status of the circuit as a whole, or the status is various parts of the circuit, at any given point in time: the current running through the DC-to-DC converter, the voltages across the current sinks, etc.

The television can use any of a number of different methods to communicate with the integrated circuit as it pertains (again, in this embodiment) to the control of the current sinks. In this embodiment, a simple one-wire, serial interface is used.

The main components of the invention, as embodied here, are the DC-to-DC converter, the three integrated circuits, and the 24 serially connected strings of LED's, eight strings per integrated circuit, each string containing ten LED's. The LED strings are typically composed of LED's that have forward voltages of approximately 3.5 volts per LED, so each string of ten LED's will have a forward voltage of approximately 35 volts. The current sinks that are part of the three integrated circuits, one current sink per LED string, typically require approximately 1.0 volts to function, so the total approximate required voltage for each channel, composed of one, ten LED string and one current sink, is approximately 36 volts. LED manufacturing process variations and the placement of particular LED's on particular strings cause variations in the required voltages from channel to channel, so the range in the case of this television might be as wide as two volts, from 36 to 38 volts.

The television also contains a number of components that, while not part of the invention claimed within, provide context within which the invention operates. First, the television contains an internal power supply, typically an AC-to-DC supply that provides a specific voltage output. In the case of this embodiment, the power supply provides 24 volts, though other power supplies are found in televisions, both higher than the required voltage and lower than the required voltage.

The television also contains a mechanism for indicating the required voltage to run the current sinks to the DC-to-DC converter, 1.0 volts for this embodiment, as indicated above. In the case of this embodiment as shown in FIG. 11, this 1.0 volt reference voltage serves as an input to the DC-to-DC converter, and is input on $V_{REF}$. There are a number of ways that the television can generate this fixed voltage, but in this particular case, a simple resistor divider network can be constructed off of the 24 volt output of the power supply.

The DC-to-DC converter requires 3 major inputs: the 24 volt input from the television's power supply, the reference voltage from the television that indicates the voltage required for the current sinks to operate as explained previously, and a feedback voltage that indicates the minimum voltage being supplied to the current sinks.

The DC-to-DC converter is responsible for the production of the approximately 36 volt requirement for the 24 channels from the television's power supply. At any point in time, the DC-to-DC converter attempts to supply just enough power for the then switched-on channels to operate. It is important to note that though the DC-to-DC converter ultimately supplies the 36 volts required for the channels to function, the feedback mechanism employed here measures the voltage above only the current sinks, which in this embodiment should be at least 1.0 volts.

The integrated circuits are organized sequentially, and each integrated circuit controls and monitors eight channels. Also in this embodiment, the PROG pin or set of pins comprise a serial interface that allows data to pass between the television and the various integrated circuits. For example, the television can use the interface to signal to the integrated circuits to dim or turn off individual channels. The integrated circuits would comply by using PWM cycles (or disabling completely) the individual current sinks.

In the generic case, each integrated circuit compares the voltages across the active current sinks in order to find the local channel minimum, compares that local channel minimum to the "global minimum" (shown as CSFBI in FIG. 11) found on the previous integrated circuits if any, and then sends the new, resultant global minimum (CSFBO) to the next integrated circuit. (In practice, the eight "local" voltages and the one "previous global" voltage are treated identically, with the result that the comparison takes nine inputs and produces one result.)

There are a number of exceptions that allow the sequentially organized integrated circuits to begin, to terminate, and to handle local conditions. For example, when a current sink is currently disabled by the integrated circuit via a command from the television, the voltage across this particular current sink drifts upward to a value between the normal value (1.0 volts) and the voltage output from the DC-to-DC converter, approximately 36 volts. Via this upward drift, the comparison between the active current sinks and the disabled current sinks effectively ignores the disabled ones.

The first integrated circuit does have a previous minimum as described above, so the CSFBI pin on the first integrated circuit is held high so that it will be effectively ignored in the comparison with the voltages across its eight onboard current sinks. In this embodiment, the voltage (shown as $V_{CC}$ in FIG. 11) is generated via a voltage divider from the television's 24 volt power supply. Any voltage that is high enough to be effectively ignored in the comparison will suffice; 3.0 volts should be sufficient.

In the same manner, the final (third, in this embodiment) integrated circuit does not have a succeeding integrated circuit to which it can send its global minimum. Rather, it sends this voltage, which is the smallest voltage across any of the current sinks within the television, to the DC-to-DC voltage converter.

The integrated circuits in this preferred embodiment perform the comparison via differential amplifiers that are generally illustrated in FIGS. 6, 7, and 8. In general, a differential amplifier consists of a first gain stage differential amplifier followed by subsequent gain stages, with the number of gain stages dependent upon the amount of gain required for the particular application. FIG. 6 shows a first gain stage differential amplifier (the input pair) with one transistor on each of the positive and negative terminals. The two transistors are in parallel, fed by a common bias current, but they have separate loads.

It is possible to replace one or both of the positive terminal and negative terminal transistors by multiple transistors in parallel. FIG. 7 shows a schematic wherein the single positive terminal transistor of FIG. 6 has been replaced thusly. If p-channel MOSFETS or PNP transistors are used for the input pair, with multiple transistors entirely in parallel on one side or the other, the transistor with the lowest gate-to-source, or base-to-emitter voltage will dominate the control of the bias current, and as such, the control of the input gain stage. Further gain stages may amplify this dominance and produce the result of that lowest input voltage controlling the amplifier.

The differential amplifier configuration with multiple transistors for the positive or negative input can be easily substituted into various amplifier topologies that contain differential amplifier input stages. FIG. 8 shows a basic two stage amplifier with multiple positive inputs.

As the resultant "lowest voltage above a current sink" is passed back to the DC-to-DC converter, the DC-to-DC converter adjusts its timing to either raise or lower the resultant voltage so that the voltage is always higher than the reference voltage. In this fashion, the DC-to-DC converter can adjust its output in real time so that the LED strings always have enough current to run, but only just enough current. In this manner, the LED system is both efficient and capable of adjusting to the changing electrical demands as the appliance asynchronously cycles the various LED strings on and off.

What is claimed is:

1. A circuit comprising:
a plurality of controllers connected in a series and including a last controller in the series, each controller of the plurality of controllers including a first terminal to couple to at least one light-emitting diode (LED) string, a second terminal, a third terminal, and a buffer having a plurality of first buffer inputs each being coupled to one of the first and second terminals, a second buffer input, and a buffer output coupled to the second buffer input and the third terminal, the buffer constructed to provide a buffer output voltage at the buffer output representative of a lower of a voltage at the first and second terminals, the buffer including a plurality of first transistors each having a gate terminal coupled to one of the plurality of first buffer inputs and a second transistor, the second transistor having a gate terminal coupled to a drain terminal of each of the plurality of first transistors and a drain terminal coupled to the buffer output and coupled to the gate terminal of the second transistor by a series capacitance and resistance; and
a DC-to-DC voltage converter including an input coupled to the third terminal of the last controller and an output, the DC-to-DC voltage converter constructed to regulate an output voltage at the output based on a voltage at the input of the DC-to-DC voltage converter.

2. The circuit of claim 1 wherein the output of the DC-to-DC voltage converter is constructed to couple to the at least one LED string.

3. The circuit of claim 1 wherein the DC-to-DC voltage converter further includes a reference terminal to receive a reference voltage.

4. The circuit of claim 3 wherein the DC-to-DC voltage converter is further constructed to regulate the output voltage based on the reference voltage and the voltage at the input of the DC-to-DC voltage converter.

5. A circuit comprising:
a plurality of controllers connected in a series and including a last controller in the series, each controller of the plurality of controllers including a first terminal to couple to at least one light-emitting diode (LED) string, a second terminal, a third terminal, and a buffer including a first transistor, a second transistor, and a third transistor, the first transistor having a gate terminal coupled to the first terminal, a drain terminal, and a source terminal coupled to a bias current source, the second transistor having a gate terminal coupled to the second terminal, a drain terminal, and a source terminal coupled to the bias current source, the third transistor having a gate terminal coupled to both the drain terminal of the first transistor and the drain terminal of the second transistor and a drain terminal, the drain terminal of the third transistor being coupled to the third terminal and coupled to the gate terminal of the third transistor by a series capacitance and resistance; and
a DC-to-DC voltage converter including an input coupled to the third terminal of the last controller and an output, the DC-to-DC voltage converter constructed to regulate an output voltage at the output based on a voltage at the input of the DC-to-DC voltage converter.

6. The circuit of claim 5 wherein the output of the DC-to-DC voltage converter is constructed to couple to the at least one LED string.

7. The circuit of claim 5 wherein the DC-to-DC voltage converter further includes a reference terminal to receive a reference voltage.

8. The circuit of claim 7 wherein the DC-to-DC voltage converter is further constructed to regulate the output voltage based on the reference voltage and the voltage at the input of the DC-to-DC voltage converter.

9. A light-emitting diode (LED) driver circuit comprising:
a first terminal to couple to at least one LED string;
a second terminal;
a third terminal; and
a buffer having plurality of first buffer inputs each coupled to one of the first and second terminals, a second buffer input, and a buffer output coupled to the second buffer input and the third terminal, the buffer constructed to provide an output voltage at the buffer output representative of a lower of a voltage at the first and second terminals, the buffer including a plurality of first transistors each having a gate terminal coupled to one of the first plurality of buffer inputs and a second transistor, the second transistor having a gate terminal coupled to a drain terminal of each of the plurality of first transistors and a drain terminal coupled to the buffer output and coupled to the gate terminal of the second transistor by a series capacitance and resistance.

10. The LED driver circuit of claim 9 wherein each of the plurality of first transistors has a source terminal coupled to a bias current source.

11. The LED driver circuit of claim 9 wherein the buffer further includes a third transistor having a drain terminal coupled to the drain terminal of each of the plurality of first transistors.

12. The LED driver circuit of claim 9 wherein the drain terminal of the second transistor is coupled to a bias current source.

13. A light-emitting diode (LED) driver circuit comprising:
a first terminal to couple to at least one LED string;
a second terminal;
a third terminal; and
a buffer including a first transistor, a second transistor, and a third transistor, the first transistor having a gate terminal coupled to the first terminal, a source terminal coupled to a first bias current source, and a drain terminal, the second transistor having a gate terminal coupled to the second terminal, a source terminal coupled to the first bias current source, and a drain terminal, the third transistor having a gate terminal coupled to both the drain terminal of the first transistor and the drain terminal of the second transistor and a drain terminal, the drain terminal of the third transistor being coupled the third terminal and coupled to the gate terminal of the third transistor by a series capacitance and resistance.

14. The LED driver circuit of claim 13 further comprising a second bias current source coupled to the drain terminal of the third transistor.

15. The LED driver circuit of claim 13 wherein the buffer further includes a fourth transistor having a drain terminal coupled to each of the drain terminal of the first transistor, the drain terminal of the second transistor, and the gate terminal of the third transistor.

16. The LED driver circuit of claim 15 wherein the buffer further includes a fifth transistor having a gate terminal coupled to the drain terminal of the third transistor and a source terminal coupled to the first bias current source.

17. A light-emitting diode (LED) driver circuit comprising:
a first terminal to couple to a first LED string;
a second terminal to couple to a second LED string;
a third terminal;
a fourth terminal; and
a buffer having a plurality of first buffer inputs each coupled to one of the first, second, and third terminals, a second buffer input, and a buffer output coupled to the second buffer input and the fourth terminal, the buffer constructed to provide an output voltage at the buffer output representative of a lowest of a voltage at the first, second, and third terminals, the buffer including a plurality of first transistors each having a gate terminal coupled to one of the plurality of first buffer inputs and a second transistor, the second transistor having a gate terminal coupled to a drain terminal of each of the plurality of first transistors and a drain terminal coupled to the buffer output and coupled to the gate terminal of the second transistor by a series capacitance and resistance.

18. The LED driver circuit of claim 17 wherein each of the plurality of first transistors has a source terminal coupled to a bias current source.

19. The LED driver circuit of claim 17 wherein the buffer further includes a third transistor having a drain terminal coupled to the drain terminal of each of the plurality of first transistors.

20. The LED driver circuit of claim 17 wherein the drain terminal of the second transistor is coupled to a bias current source.

21. A light-emitting diode (LED) driver circuit comprising:
a first terminal to couple to a first LED string;
a second terminal to couple to a second LED string;
a third terminal;
a fourth terminal; and
a buffer including a first transistor, a second transistor, a third transistor, and a fourth transistor, the first transistor having a gate terminal coupled to the first terminal, a source terminal coupled to a first bias current source, and a drain terminal, the second transistor having a gate terminal coupled to the second terminal, a source terminal coupled to the first bias current source, and a drain terminal, the third transistor having a gate terminal coupled to the third terminal, a source terminal coupled to the first bias current source, and a drain terminal, the fourth transistor having a gate terminal coupled to the drain terminal of each of the first transistor, the second transistor, and the third transistor and a drain terminal, the drain terminal of the fourth transistor being coupled to the fourth terminal and coupled to the gate terminal of the fourth transistor by a series capacitance and resistance.

22. The LED driver circuit of claim 21 further comprising a second bias current source coupled to the drain terminal of the fourth transistor.

23. The LED driver circuit of claim 21 wherein the buffer further includes a fifth transistor having a drain terminal coupled to each of the drain terminal of the first transistor, the drain terminal of the second transistor, the drain terminal of the third transistor, and the gate terminal of the fourth transistor.

24. The LED driver circuit of claim 23 wherein the buffer further includes a sixth transistor having a gate terminal coupled to the drain terminal of the fourth transistor and a source terminal coupled to the first bias current source.

25. A light-emitting diode (LED) driver circuit comprising:
one or more first terminals each being to couple to a respective LED string of one or more LED strings;
a second terminal;
a third terminal; and
a buffer having one or more first buffer inputs each being coupled to a respective first terminal of the one or more first terminals, a second buffer input, a third buffer input, and a buffer output coupled to the third buffer input and the third terminal, the buffer constructed to provide an output voltage at the buffer output representative of a lowest of a voltage at each of the one or more first terminals and the second terminal, the buffer including one or more first transistors each having a gate terminal coupled to a respective first buffer input of the one or more first buffer inputs, a second transistor having a gate terminal coupled the second buffer input, and a third transistor having a gate terminal coupled to a drain terminal of each of the one or more first transistors and coupled to a drain terminal of the second transistor, the third transistor having a drain terminal coupled to the buffer output and coupled to the gate terminal of the third transistor by a series capacitance and resistance.

* * * * *